US009876656B1

(12) United States Patent
Freitas

(10) Patent No.: US 9,876,656 B1
(45) Date of Patent: Jan. 23, 2018

(54) DIFFERENTIAL FEEDBACK EQUALIZER AND METHOD OF IMPLEMENTING A DIFFERENTIAL FEEDBACK EQUALIZER

(71) Applicant: Xilinx, Inc., San Jose, CA (US)

(72) Inventor: David A. Freitas, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/206,818

(22) Filed: Jul. 11, 2016

(51) Int. Cl.
*H03H 7/40* (2006.01)
*H04L 25/03* (2006.01)
*H04B 1/16* (2006.01)

(52) U.S. Cl.
CPC ......... *H04L 25/03057* (2013.01); *H04B 1/16* (2013.01)

(58) Field of Classification Search
CPC ....... H04L 25/03057; H04L 2015/0349; H04L 7/0079; G06F 1/24
USPC .......................... 375/233, 232, 229; 327/143
See application file for complete search history.

(56) References Cited

U.S. PATENT DOCUMENTS

| 7,106,099 | B1 | 9/2006 | Nix |
| 7,408,981 | B2 | 8/2008 | Chen |
| 7,599,431 | B1 | 10/2009 | Anderson et al. |
| 7,668,238 | B1 | 2/2010 | Rokhsaz |
| 7,924,912 | B1 * | 4/2011 | Rokhsaz ........... H04L 25/03057 375/229 |
| 8,917,803 | B1 | 12/2014 | Asuncion et al. |
| 9,025,654 | B1 * | 5/2015 | Su ..................... H04L 25/03038 375/233 |
| 2010/0202506 | A1 * | 8/2010 | Bulzacchelli ..... H04L 25/03057 375/233 |
| 2013/0266055 | A1 * | 10/2013 | Matsumoto ............. H04L 25/06 375/232 |
| 2013/0285717 | A1 * | 10/2013 | Xiao ........................ G06F 1/24 327/143 |
| 2013/0287089 | A1 * | 10/2013 | Bulzacchelli ..... H04L 25/03057 375/233 |

OTHER PUBLICATIONS

Son, Seuk et al., "A 2.3-mW, 5-Gb/s, Low-Power Decision-Feedback Equalizer Receiver Front-End and its Two-Step, Minimum Bit-Error-Rate Adaptation Algorithm," IEEE Journal of Solid-State Circuits, Nov. 2013, pp. 2693-2704, vol. 48, No. 11, IEEE, Piscataway, New Jersey, USA.

\* cited by examiner

*Primary Examiner* — Khai Tran
(74) *Attorney, Agent, or Firm* — John J. King

(57) ABSTRACT

A differential feedback equalizer is described. A differential feedback equalizer comprises a summer circuit configured to receive a differential input signal and a summer tap circuit output and to generate a summer circuit differential output; a first latch configured to receive the summer circuit differential output from the summer circuit and to generate a first differential latch output comprising a first state of the differential feedback equalizer; and a feedback circuit having a NAND gate coupled to an output of the first latch and configured to generate a differential tap feedback signal; wherein the feedback circuit comprises a NAND gate buffer that maintains the differential tap feedback signal at a predetermined voltage during a reset phase of the first latch. A method of implementing a differential feedback equalizer is also described.

20 Claims, 5 Drawing Sheets

US 9,876,656 B1

DIFFERENTIAL FEEDBACK EQUALIZER AND METHOD OF IMPLEMENTING A DIFFERENTIAL FEEDBACK EQUALIZER

TECHNICAL FIELD

The present invention relates generally to data receivers, and in particular, to a receiver having a differential feedback equalizer and a method of implementing a differential feedback equalizer.

BACKGROUND

A high speed analog Decision Feedback Equalization (DFE) can be achieved by providing fast direct h1 feedback, and generally requires fast direct h1 feedback to avoid having to implement an unrolled h1 DFE architecture, which requires more power and circuit area. However, the timing of the direct h1 feedback must be fast enough for the DFE to properly equalize the channel at the required data rates. A DFE circuit consists a summing circuit, which sums the different DFE feedback taps with the input analog data, followed by a sampling circuit that contains a bank of sampling or capture latches. Each capture latch also functions as a voltage comparator that can have different voltage thresholds. The output of the sample latch in the sampling block provides the h1 tap feedback to the summing circuit.

Conventional capture latch designs consist of a strong-arm latch, whose outputs reset to a reference voltage, such as AVCC, every half sample clock cycle, followed by a second latch to convert the strong-arm latch outputs to Non-Return-to-Zero (NRZ) output levels. However, the combined clock-to-q delay of the strong-arm latch with the NRZ latch is too slow to meet the direct h1 feedback timing for fast data rates, such as a 56 Gbit data rate.

Accordingly, circuits and methods that improve the performance of a differential feedback equalizer are beneficial.

SUMMARY

A differential feedback equalizer is described and comprises a summer circuit configured to receive a differential input signal and a summer tap circuit output and to generate a summer circuit differential output; a first latch configured to receive the summer circuit differential output from the summer circuit and to generate a first differential latch output comprising a first state of the differential feedback equalizer; and a feedback circuit having a NAND gate coupled to an output of the first latch and configured to generate a differential tap feedback signal; wherein the feedback circuit comprises a NAND gate buffer that maintains the differential tap feedback signal at a predetermined voltage during a reset phase of the first latch.

A method of implementing a differential feedback equalizer is also described. The method comprises configuring a summer circuit to receive a differential input signal and a summer tap circuit output and to generate a summer circuit differential output; configuring a first latch to receive the summer circuit differential output from the summer circuit and to generate a first differential latch output comprising a first state of the differential feedback equalizer; and providing a feedback circuit having a NAND gate coupled to an output of the first latch and configured to generate a differential tap feedback signal; wherein the feedback circuit comprises a NAND gate buffer that maintains the differential tap feedback signal at a predetermined voltage during a reset phase of the first latch.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods implement a half-sample rate architecture, having an even and odd summer and an even and odd sampling block. To provide direct h1 feedback, the output of an odd capture latch output provides the polarity for the h1 feedback to the even summer, and an output of the even capture latch output provides the polarity for the h1 feedback to the odd summer. The summer may be an NFET differential pair amplifier with pull-up load resistors and an NFET-based tail current source. A summer tap circuit on the output of the summer contains an NFET differential pair used as a switching element to steer the weighted tail current to either pull-up resistor of the summer. The feedback from the tap latches, which may be a NAND gate for example, controls the polarity of the weighted tap currents on the summer output. For h1 representing a first state of the differential equalizer, the tap feedback is provided from the initial capture latch, which may be a strong-arm latch, for example.

The circuits and methods provide an improved approach to setting the reset level of the h1 signals to AVCC without adding additional delay, such as a second delay buffer. The circuits and methods include a NAND gate buffer on the strong-arm latch output that switches the h1 feedback outputs to AVCC during the reset phase. The NAND gate buffer uses the sample clock to force the h1 outputs high during the reset phase when the sample clock is low and then releases the outputs when the sample clock goes high. To avoid the NAND gate output from having a common mode dip during the regeneration phase of the strong-arm latch, the sample clock that drives the gates of the P-channel Field Effect Transistors (PFETs) in the NAND gate buffer are delayed. This delay momentarily holds the h1 feedback outputs at AVCC during the majority of the regeneration phase, minimizing any common mode dip that may occur on the NAND gate buffer outputs.

Figure 1:
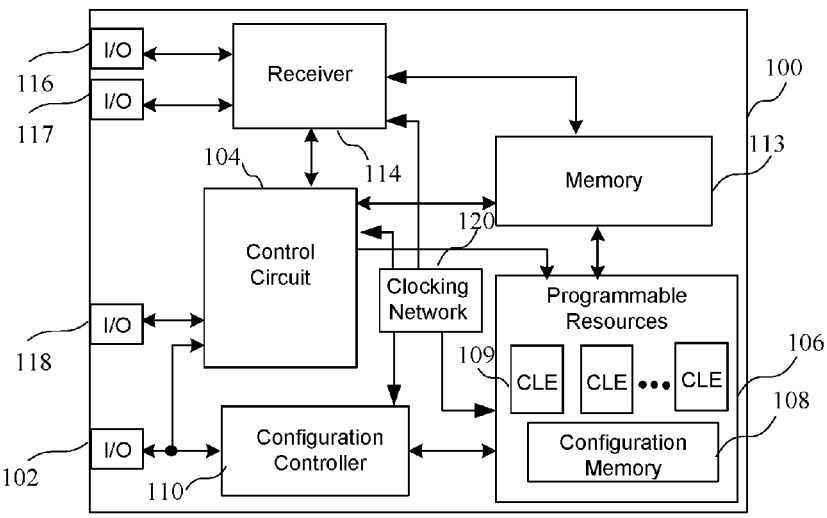
FIG. 1 is a block diagram of an integrated circuit comprising a circuit for receiving data in the integrated circuit.

Turning first to FIG. 1, a block diagram of an integrated circuit 100 comprising a circuit for receiving data in the integrated circuit is shown. In particular, an input/output port 102 is coupled to a control circuit 104 that controls programmable resources 106 having configurable logic elements 109. Configuration data may be provided to the configuration memory 108 by a configuration controller 110. The configuration data enables the operation of the programmable resources 106. A memory 113 may be coupled to the control circuit 104 and the programmable resources 106. A receiver circuit 114 may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. A differential feedback equalizer as described in more detail below could be implemented to enable the operation of the receiver of FIG. 1, for example.

Figure 2:
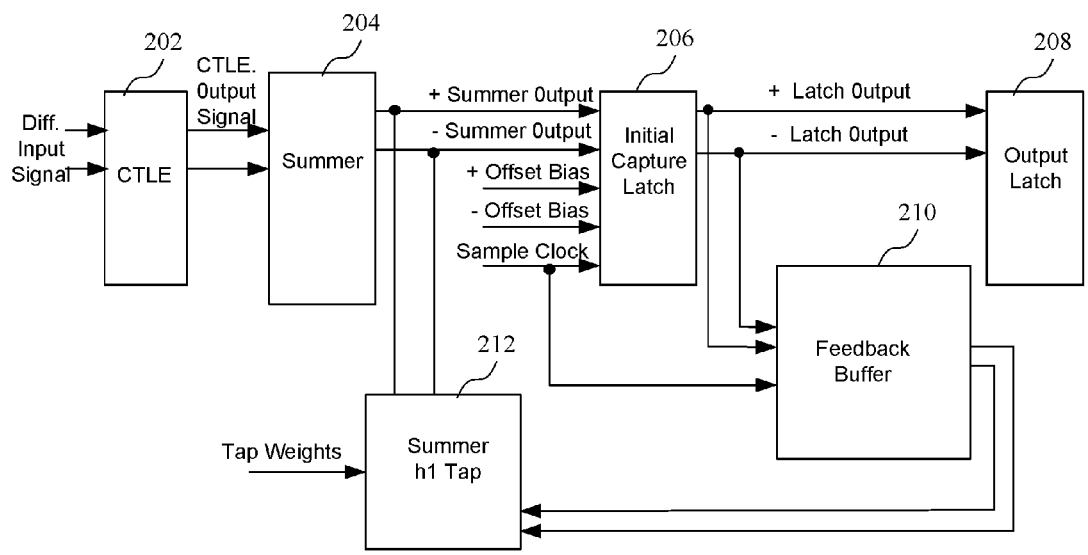
FIG. 2 is a block diagram of a differential feedback equalizer.

Turning now to FIG. 2, a block diagram of a differential feedback equalizer associated with a continuous time linear equalizer (CTLE) is shown. The CTLE 202 is coupled to receive a differential input signal and generate a CTLE output signal. A summer circuit 204 generates a differential summer output (+summer output and −summer output) that are coupled to an initial capture latch 206. The initial capture latch 206 also receives offset bias signals (+offset bias and −offset bias) and a sample clock signal. The initial capture latch 206 generates a differential latch output (+latch output and −latch output), which are coupled to an output latch 208. The sample clock signal and the differential latch output is provided to a feedback buffer 210, an output of which is provided to a summer h1 tap circuit 212 that generates an h1 feedback component based upon tap weights (TW) received at the summer h1 tap circuit. As will be described in more detail below, the feedback buffer 210 may comprise even and odd circuits having a NAND gate that enables improved performance for the differential equalizer.

Figure 3:
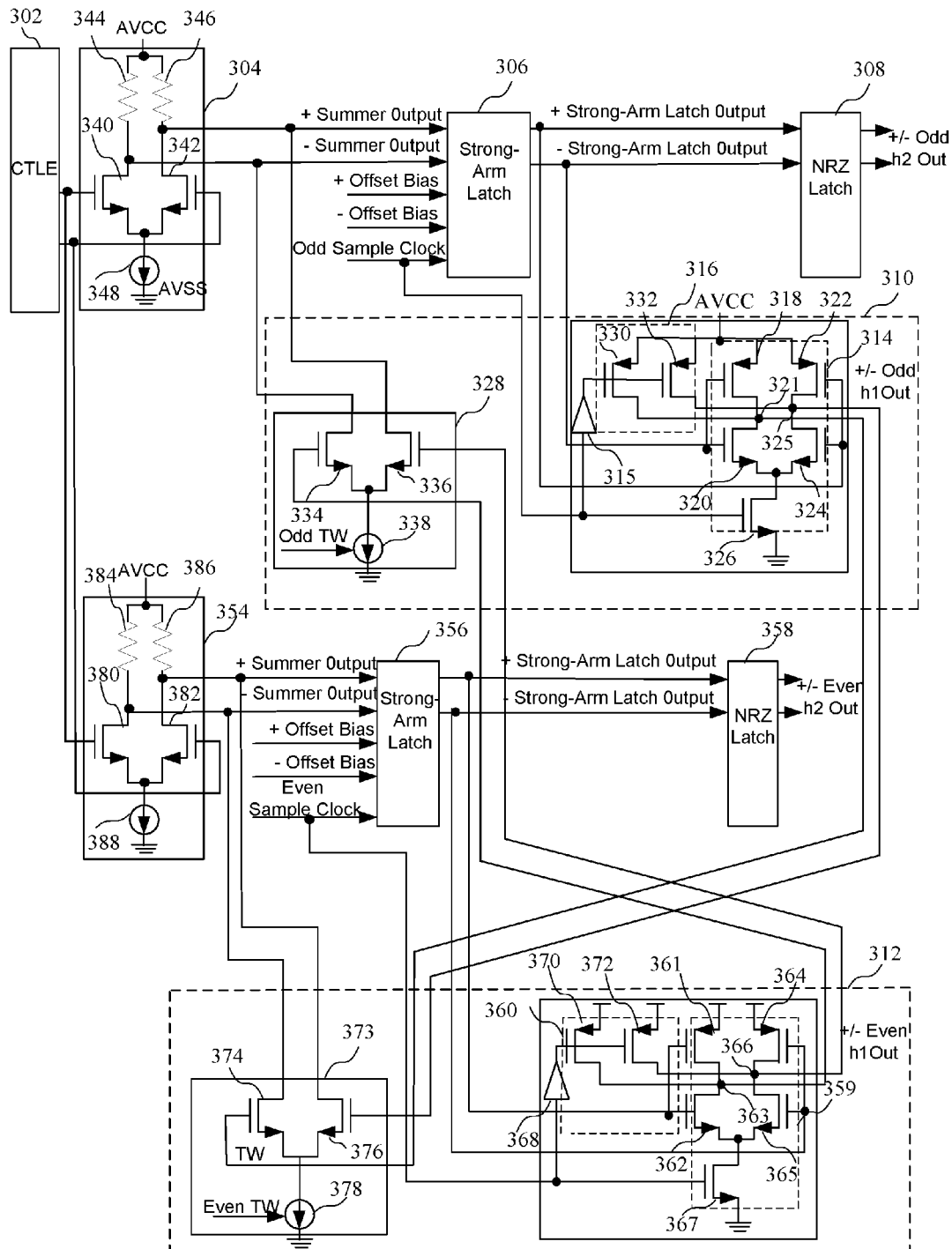
FIG. 3 is a block diagram of a differential feedback equalizer showing odd and even tap feedback signals.

Turning now to FIG. 3, a block diagram of a differential feedback equalizer generating odd and even feedback tap signals is shown. The circuit of FIG. 3 may be implemented to provide direct h1 feedback in a half-sample rate architecture, where the DFE and summer are split into halves, odd and even, as will also be described in more detail in reference to FIG. 4. A CTLE circuit 302 provides a differential CTLE output, based upon a differential input signal, to an odd summer circuit 304. As will be described in more detail below, the odd summer circuit receives even h1 tap signals from a feedback NAND gate associated with an even portion of the circuit. The odd summer circuit 304 comprises a pair of transistors 340 and 342 coupled a reference voltage (such as AVCC) by way of corresponding pull-up resistors 344 and 346 at their drains. The sources of the transistors 340 and 342 are coupled together at a current source 348 coupled to the ground, which may be AVSS for example. The summer outputs generated at the drains of transistors 340 and 342 are coupled to a latch, shown here as a strong-arm latch 306, the outputs of which are coupled to an NRZ latch 308.

An odd feedback circuit 310 enables generating h1 control signals associated with the even portion of the circuit and receiving h1 control signals from a corresponding even feedback circuit 312. The odd feedback circuit 310 comprises a NAND gate 314 associated with a delay element 315 and NAND gate buffer circuit 316. The NAND gate 314 comprises a pair of transistors 318 and 320 coupled in series and having a common node 321 and a pair of transistors 322 and 324 coupled in series and having a common node 325, each pair of which is connected to a transistor 326 that is configured to receive the odd sample clock at a gate and is coupled to ground. The delay element 315 coupled to receive the odd sample clock signal is coupled to buffering transistors 330 and 332 of the NAND gate buffer 316, the drains of which are coupled to corresponding common nodes 321 and 325. The outputs (+/−odd h1 out) at the nodes 321 and 325 comprise feedback control signals for the even summer h1 tap circuit, as will be described below. Similarly, the odd summer h1 tap circuit 328 receives feedback control signals (+/−even h1 out) from the even feedback circuit 312.

The odd summer h1 tap circuit 328, receiving even h1 tap signals representing a first state of the differential equalizer associated with an odd half of the circuit, comprises a first transistor 334 and a second transistor 336 having sources that are coupled together at a current source 338. The drains of the transistors 334 and 336 of the odd summer h1 tap circuit 328 are coupled to the outputs of the summer circuit 304. The current source 338 is configured to receive odd tap weights that control the currents at the outputs of the odd summer circuit 304. The summer circuit 304 comprises an arrangement of transistors, including transistors 340 and 342 coupled to corresponding pull-up resistors 344 and 346 and having sources that are coupled to a current source 348.

The circuit for generating even outputs is similarly arranged. Outputs of the CTLE circuit 302 are provided to an even summer circuit 354, the output of which is coupled to a strong-arm latch 356 and an NRZ latch 358. The even feedback circuit 312 enables generating h1 control signals associated with the odd portion of the circuit and receiving h1 control signals from the corresponding odd feedback circuit 310. The even feedback circuit 312 comprises a NAND gate 359 associated with a delay circuit 368 and a NAND gate buffer 360. The NAND gate 359 comprises a pair of transistors 361 and 362 coupled in series and having a common node 363 and a pair of transistors 364 and 365 coupled in series and having a common node 366, each pair of which is connected to a transistor 367 that is configured to receive the even sample clock at a gate and is coupled to ground. The delay element 368 coupled to receive the even sample clock is coupled to buffering transistors 370 and 372, the drains of which are coupled to corresponding common nodes 363 and 366. The outputs at the nodes 363 and 366 comprise feedback control signals for the odd summer h1 tap circuit. Similarly, the even summer h1 tap circuit 373 receives feedback control signals, comprising odd h1 tap signals representing a first state of the differential equalizer associated with an even half of the circuit, from the odd feedback circuit 310. The even summer h1 tap circuit 373 comprises a first transistor 374 and a second transistor 376 having sources that are coupled together at a current source 378. The current source 378 is configured to receive even tap weights. The drains of the transistors 374 and 376 of the even summer h1 tap circuit 373 are coupled to the outputs of the even summer circuit 354. The even summer h1 tap circuit 373 receives feedback control signals comprising odd h1 tap signals fed back from the NAND gate 314. The even summer circuit 354 comprises a pair of transistors 380 and 382 coupled to AVCC by way of corresponding pull-up resistors 384 and 386 at their drains. The sources of the transistors 380 and 382 are coupled together at a current source 388 coupled the ground. The plus and minus summer outputs generated at the drains of transistors 380 and 382 are coupled to a latch, shown here as the strong-arm latch 356, the strong-arm latch outputs of which are coupled to an output NRZ latch 358.

Figure 5:
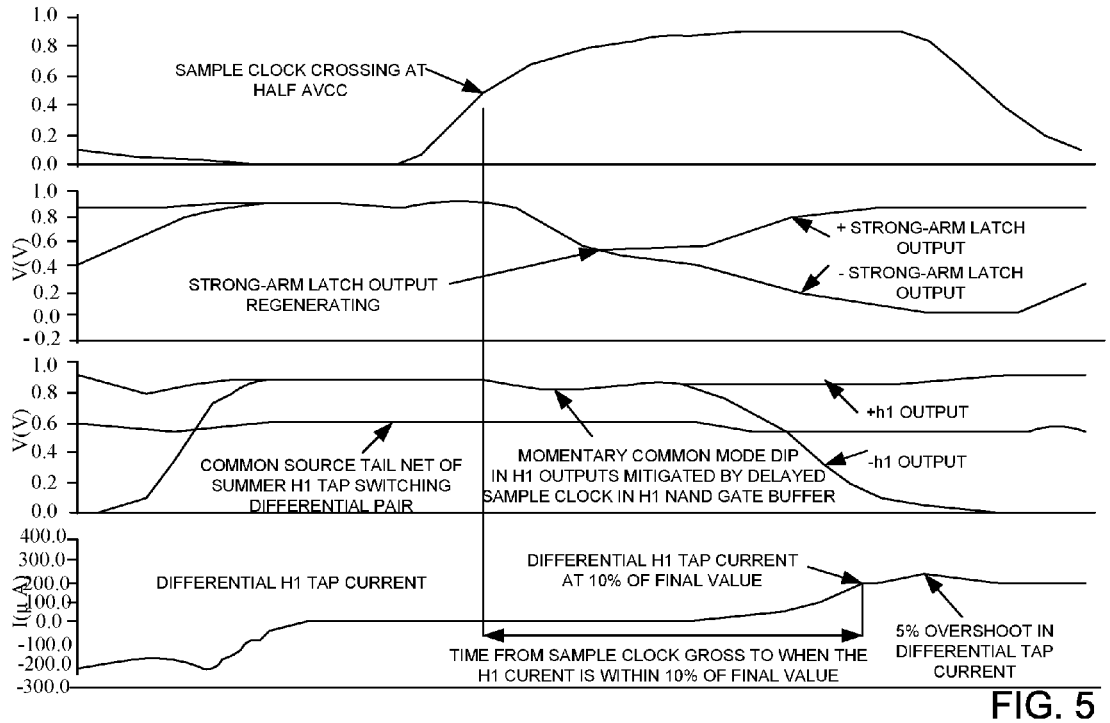
FIG. 5 is a timing diagram showing the operation of the differential feedback equalizer of FIG. 3 with a feedback buffer.
Figure 6:
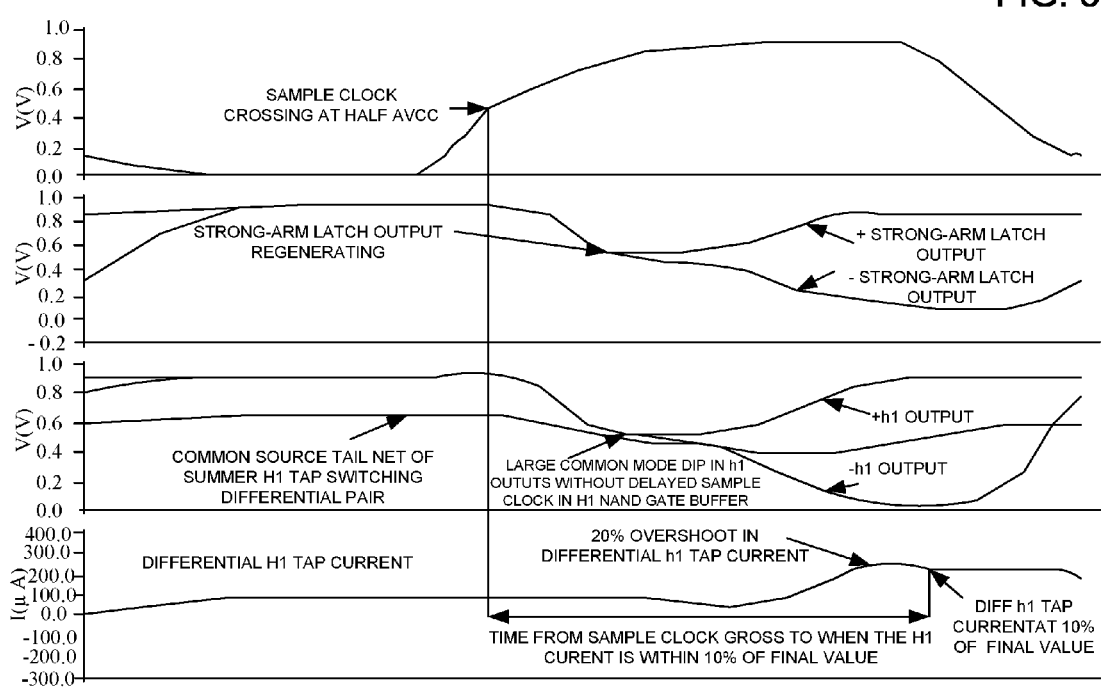
FIG. 6 is a timing diagram showing the operation of the differential feedback equalizer of FIG. 3 without the delay to mitigate common mode dip in the feedback buffer.

The circuit of FIG. 3 provides an improved approach to setting the reset level of the h1 signals at the output of the strong-arm latch to a reference voltage, such as AVCC, without adding an additional delay. The addition of a NAND gate buffer on the strong-arm latch output enables switching the h1 feedback outputs to AVCC during the reset phase of the strong-arm latch. The NAND gate buffer uses the sample clock to force the h1 outputs high during the reset phase when the sample clock is low, and then releases the outputs when the sample clock goes high. To avoid the NAND gate output from having a common mode dip during the regeneration phase of the strong-arm latch, the sample clock which drives the gates of the transistors in the NAND gate buffer is delayed. This delay momentarily holds the h1 feedback outputs (of the odd feedback circuit 310 and the even feedback circuit 312) at AVCC during the majority of the regeneration phase for that half cycle, minimizing any common mode dip on the NAND gate buffer outputs, as shown in FIGS. 5 and 6. The timing diagram shows the operation of the differential feedback equalizer of FIG. 3 with a feedback buffer in FIG. 5 and without a feedback buffer in FIG. 6. Simulation results of the capture latch with the NAND gate buffer also show the h1 settle times with delaying the release of the NAND gate (FIG. 5) and without delaying the release of the NAND gate buffer (FIG. 6). Without the delayed release, the h1 current had significantly higher overshoot causing a longer delay in the h1 settle time.

Figure 4:
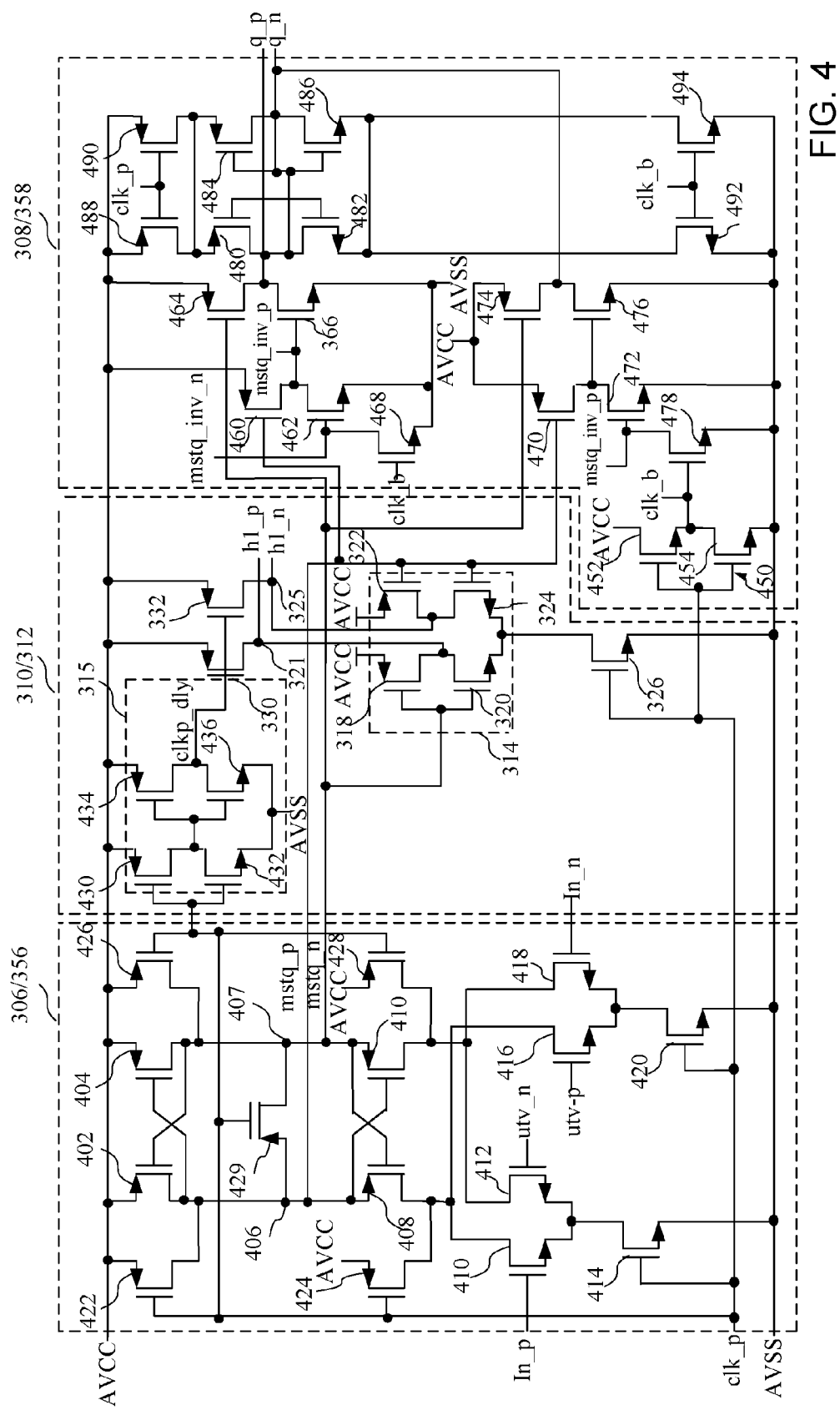
FIG. 4 is a block diagram showing a strong-arm latch, an NRZ latch and a feedback buffer of the differential feedback equalizer of FIG. 3.

Turning now to FIG. 4, a block diagram shows a strong-arm latch, an NRZ latch and a feedback buffer of the differential feedback equalizer of FIG. 3, and could be implemented in each of the even and odd paths of FIG. 3. In particular, the strong-arm latch 306, 356 comprises an output stage having PMOS pull-up transistors including a first pair of cross-coupled transistors 402 and 404 coupled between VCC and a second pair of cross-coupled transistors 408 and 410 at output nodes 406 and 407 to generate outputs mstq_p and mstq_n of the strong-arm latch which are provided to both the feedback buffer and the NRZ latch. The strong-arm latch further comprises input transistors for receiving the input signals including transistors 410 and 412 having sources coupled to a first current path control transistor 414 and transistors 416 and 418 having sources coupled to a second current path control transistor 420. The drain of the transistor 410 is coupled to the drains of transistors 408 and 416, while the drain of transistor 412 is coupled to the drains of transistors 412 and 418. The input signal (ln_p and ln_n) is coupled to the gates of transistors 410 and 418 while offset signals (utv_p and utv_n) are coupled to the gates of transistors 412 and 416. The differential output signal (mstq_p and mstq_n) are generated at the nodes 406 and 407 in response to the input signals ln_p and ln_n and the offset signals utv_p and utv_n and the clock signal (clk_p) coupled to the gates of the current path control transistors 414 and 420.

A strong-arm latch is selected for the receiver to function as a high speed sampling comparator of the analog input signals. On the rising edge of the sample clock, the strong-arm latch compares the analog sum of the in_p and utv_p input signals versus the analog sum of the in_n and utv_n signals. If (in_p+utv_p)>(in_n+utv_n) then the outputs of the strong-arm latch will go high (q_p=AVCC and q_n=AVSS). Conversely, if (in_p+utv_p)<(in_n+ut_n) then the outputs of the strong-arm latch will go low (q_p=AVSS and q_n=AVCC). The receiver compares the difference in the sums of these inputs down to small levels, such as less than a few millivolts. The strong-arm latch is beneficial as a sampling voltage comparator based on its sampling speed, low power, and sensitivity. The dual differential input in the strong-arm latch provides a means for inserting offset on the input.

The output of the NRZ latch is the h2 state of the DFE. Unlike the h1 state, the h2 state is the NRZ output because it is necessary for the feedback level into the summer to remain valid for its entire duration for the h2 feedback to correctly settle on the output of the summer before the next transition. The NRZ latch output is also the data output for the sampler. While the output latch does not necessarily need to be an NRZ latch, an NRZ latch enables a following decoder and latch to meet timing.

Reset transistors are also provided to reset nodes of the strong-arm latch 306, 356. More particularly, transistor 422 is coupled between AVCC and node 406, and is configured to receive the CLK signal at its gate to reset node 406. Transistor 424 is coupled between AVCC and the drain of the transistor 410, and is configured to receive the CLK signal at its gate to reset the signal generated by the input transistor 410. Transistor 426 is coupled between AVCC and node 407, and is configured to receive the CLK signal at its gate to reset node 407. Transistor 428 is coupled between AVCC and the drain of the transistor 411, and is configured to receive the CLK signal at its gate to reset the input signal generated by transistor 418. Transistor 429 is coupled between nodes 406 and 407, and has a gate coupled to receive the clk_p signal.

Details of the delay element 315 and an inverter for generating an inverted clock signal of the feedback circuit 310, 312 are also shown in FIG. 4. The delay element 315 comprises a first inverter comprising transistors 430 and 432 coupled between AVCC and AVSS to receive the clock signal (clk_p) signal at their gates, and transistors 434 and 436 having gates coupled to the drains of transistors 430 and 432 to generate a delayed clock signal (clkp_dly). The delayed clock signal is a sample clock signal that delays the release of the h1 outputs at drains of transistors 330 and 332, as will be discussed in more detail below. An inverter 450 comprising transistors 452 and 454 are coupled to receive the clk_p signal and generate an inverted clock signal (clk_b).

The NRZ latch 308, 358 comprises a first circuit configured to receive the strong-arm latch output signals (mstq_p and mstq_n) and generate the NRZ latch outputs q_p and q_n, which are the odd and even h2 outputs. The strong-arm latch output signal mstq_p is coupled to the gate of a transistor 460 that is coupled in series with a transistor 462 configured to receive inverted signal mstq_inv_n of the strong-arm latch at its gate, while strong-arm latch output signal mstq_n is coupled to the gate of a transistor 464 that is coupled in series with a transistor 466 configured to receive the signal mstq_inv_n of the strong-arm latch at its gate. A source of a transistor 468 is coupled to a gate of the transistor 462, which is configured to receive inverted clock signal (clk_b) at its gate to pull the gate of the transistor 462 to ground (AVSS).

Similarly, the strong-arm latch output signal mstq_p is coupled to the gate of a transistor 470 that is coupled in series with a transistor 472 configured to receive the signal mstq_inv_p at its gate, while strong-arm latch output signal mstq_n is coupled to the gate of a transistor 474 that is coupled in series with a transistor 476 having a gate coupled to the drains of transistors 470 and 472. A source of a transistor 478 is coupled to a gate of the transistor 472, and is configured to receive inverted clock signal (clk_b) at its gate to pull the gate of the transistor 472 to ground. Transistors 468 and 478 are used to drive cross connected nets, mstq_inv_p and mstq_inv_n, to AVSS during the reset clock phase. This cross-connection design in the NRZ latch is used to improve NRZ latch speed.

A node at the drains of the transistors 464 and 466 generate the output signal q_p, while the drains of transistors 474 and 476 generate the output signal q_n which are the latched outputs of the NRZ latch. The NRZ latch element comprises a first pair of transistors 480 and 482 having sources that are coupled together and to the sources of transistors 464 and 466, and a second pair of transistors 484 and 486 having sources that are coupled together and to the sources of the transistors 480 and 484. Pull-up transistors 488 and 490 are coupled between AVCC and drains of the transistor 480 and 484, respectively. Pull-down transistors 492 and 494 are coupled between the sources of transistors 482 and 486 and ground. The gates of transistors 488 and 490 are configured to receive clk_p, and the drains of transistors 488 and 490 are coupled together at the sources of transistors 480 and 484. The gates of transistors 492 and 494 are configured to receive the clk_b signal. The NRZ latch uses the clock inputs to hold the output data levels when the strong-arm latch is in its reset phase.

The strong-arm latch receives the output of the summer circuit and compares it to the differential utv_p/n input signal at the gates of transistors 416 and 412 at the rising edge of the sample clock (clk_p). When implementing a PAM-4 detector for example, different levels of a PAM-4 detector would be applied to the utv_p/n inputs. The capture latch provides two complementary outputs, the q outputs (q_p and q_n) and the h1 outputs (h1_p and h1_n). The q outputs of the capture latch are the NRZ data outputs of the latch which are also used as the direct h2 feedback to the summer. The h1 outputs are the direct h1 feedback to the summer.

The NAND gate buffer circuit receives the strong-arm latch outputs, mstq_p and mstq_n. The other input to the NAND gate is the capture latch sample clock input, clk_p. The outputs of the NAND gate buffer, h1_p and h1_n, are the h1 feedback signals to the summer h1 tap circuit. Since both outputs h1_p and h1_n of the two NAND gates need to reset to AVCC when clk_p is low, the single NFET 326 turns off and PFETs 330 and 332 turn on when clk_p is low driving the two NAND gate outputs high. When clk_p rises to start a sample, NFET 326 turns on allowing the NFETs 320 and 324 and PFETs 318 and 320, to switch based on the outputs of the strong-arm latch as it regenerates. But, the PFETs, 330 and 332, remain on momentarily, keeping the outputs of the two NAND gates high until the delayed sample clock, clkp_dly, goes high. The delayed sample clock, clkp_dly is created by using two inverting CMOS buffers.

The offset bias signals of the strong-arm latch in FIG. 2 correspond to the utv_p and utv_n differential signal inputs shown in FIG. 4, and have multiple purposes. They provide a means for cancelling any offset in the strong-arm latch due to device mismatch. During offset calibration, the analog inputs, in_p and in_n, will be temporarily shorted together. Then the utv_p and utv_n signals are adjusted until the output of the latch is nulled, indicating the latch offset has been cancelled by the utv_p and utv_n signals. The cancelling offset remains applied to the latch. Also, there are cases where it may be necessary to have a desired amount of offset between the analog inputs, in_p and in_n, before the latch output goes high or low. For example, in a PAM-4 application the analog input will have 4 distinct differential levels (i.e. −300 mV, −100 mV, +100 mV, and +300 mV). To detect which of the four PAM-4 levels is being sampled, 3 strong-arm latches would be implemented. The positive threshold strong-arm latch will have its utv_p and utv_n inputs set to a positive differential offset (i.e. +200 mV plus the mismatch cancelling offset from the calibration). The positive threshold strong-arm latch will detect input levels between +300 mV and +100 mV. The middle strong-arm latch will have no differential offset on the utv_p and utv_n signals beyond the mismatch cancellation offset. The middle strong-arm latch detects between +100 mV and −100 mV input levels. The third negative threshold latch will have a negative offset (−200 mV plus any mismatch cancelling offset from the calibration). The negative threshold strong-arm latch detects between −300 mV and −100 mV input levels. The outputs of the 3 strong-arm latches with the 3 distinct input offsets are then decoded into the PAM-4 data outputs.

Turning now to FIGS. 5 and 6, timing diagrams show the operation of the differential feedback equalizer of FIG. 3 with a feedback buffer. Simulation results of the capture latch with the NAND gate buffer showing the h1 settle times with delaying the release of the NAND gate (FIG. 3) and without delaying the release of the NAND gate buffer (FIG. 4). Without the delayed release, the h1 current had significantly higher overshoot causing a longer delay in the h1 settle time.

Figure 7:
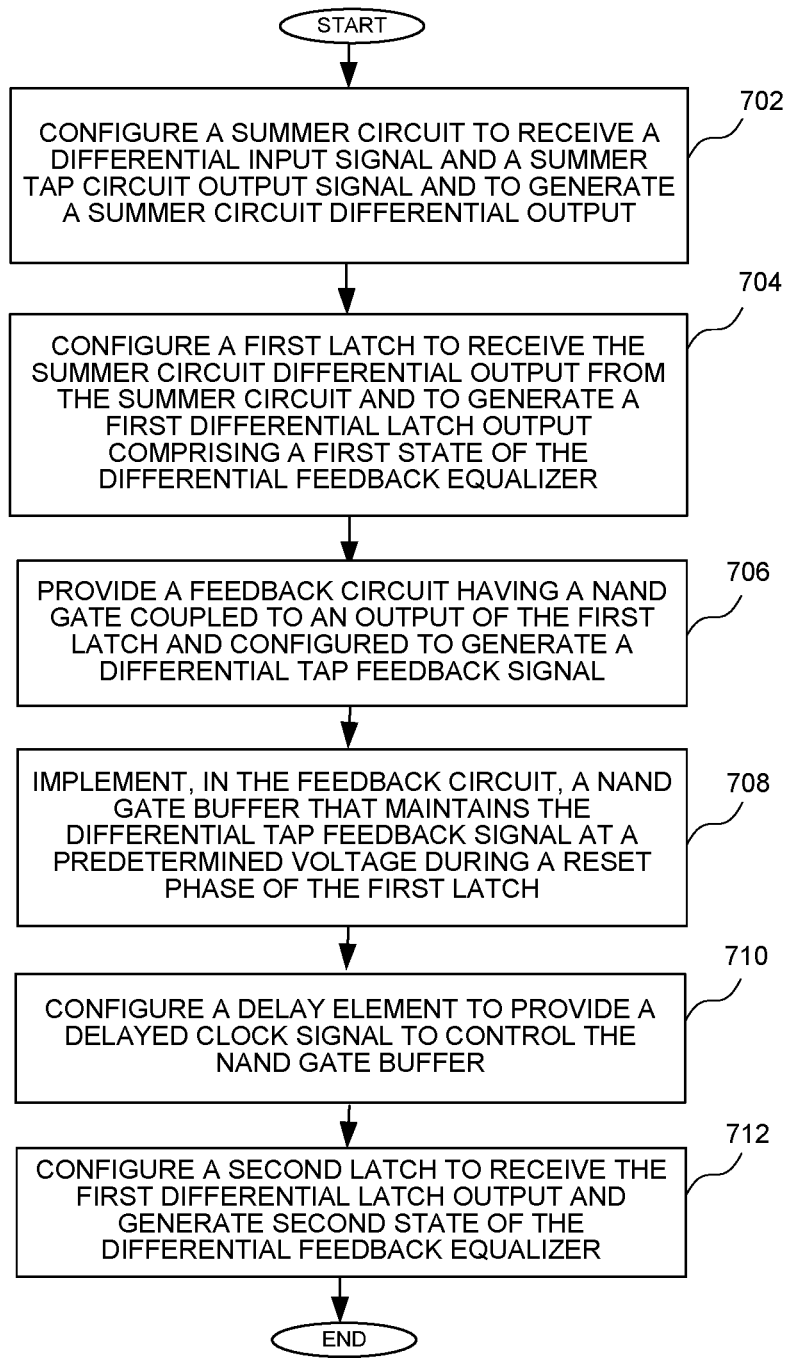
FIG. 7 is a flow chart showing a method of implementing a differential feedback equalizer.

Turning now to FIG. 7, a flow chart shows a method of implementing a differential feedback equalizer. In particular, a summer circuit is configured to receive a differential input signal and a summer tap circuit output and to generate a summer circuit differential output at a block 702. A first latch is configured to receive the summer circuit differential output from the summer circuit and to generate a first differential latch output comprising a first state of the differential feedback equalizer at a block 704. A feedback circuit having a NAND gate coupled to an output of the first latch and configured to generate a differential tap feedback signal is provided at a block 706. A NAND gate buffer is implemented in the feedback circuit that maintains the differential tap feedback signal at a predetermined voltage during a reset phase of the first latch at a block 708. A delay element is configured to provide a delayed clock signal to control the NAND gate buffer at a block 710. A second latch is configured to receive the first differential latch output and generate second state of the differential feedback equalizer at a block 712.

The method may be implemented according to any of the circuits of FIGS. 1-4, or other suitable circuits. The method may further comprise other elements for implementing a differential feedback equalizer as described above. For example, a summer tap circuit may be configured to provide the summer tap circuit output. Also, the method may comprise a method of implementing a half sample rate differential feedback equalizer, and further comprise configuring the summer circuit and the first latch to generate odd differential output signals and configuring the summer tap circuit to receive even differential tap feedback signals. Therefore, the differential feedback equalizer may comprise a second circuit associated with even signals. That is, the second circuit may comprise a second summer circuit configured to receive the differential input signal and a second summer circuit tap output and to generate a second summer circuit differential output; a second latch configured to receive the second summer circuit differential output from the second summer circuit and to generate a second differential latch output comprising an even first state of the differential feedback equalizer; and a second feedback circuit having a second NAND gate coupled to an output of the second latch and configured to generate a second differential tap feedback signal; wherein the second feedback circuit comprises a second NAND gate buffer that maintains the second differential tap feedback signal at a predetermined voltage during a reset phase of the second latch.

It can therefore be appreciated that new differential feedback equalizers and methods of implementing differential feedback equalizers have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A differential feedback equalizer comprising:
   a summer circuit configured to receive a differential input signal and a summer tap circuit output and to generate a summer circuit differential output;
   a first latch configured to receive the summer circuit differential output from the summer circuit and to generate a first differential latch output comprising a first state of the differential feedback equalizer; and
   a feedback circuit having a NAND gate coupled to an output of the first latch and configured to generate a differential tap feedback signal;
   wherein the feedback circuit comprises a NAND gate buffer that maintains the differential tap feedback signal at a predetermined voltage during a reset phase of the first latch.

2. The differential feedback equalizer of claim 1 further comprising a second latch configured to receive the first differential latch output and generate a second state of the differential feedback equalizer.

3. The differential feedback equalizer of claim 2 wherein the second latch comprises an NRZ latch.

4. The differential feedback equalizer of claim 1 wherein the feedback circuit comprises a delay element configured to provide a delayed clock signal to control the NAND gate buffer.

5. The differential feedback equalizer of claim 1 wherein the feedback circuit comprises a summer tap circuit configured to provide the summer tap circuit output.

6. The differential feedback equalizer of claim 5 wherein the differential feedback equalizer is a half sample rate differential feedback equalizer, and the summer circuit and the first latch are configured to generate odd differential output signals and the tap summer circuit is configured to receive even differential tap feedback signals.

7. The differential feedback equalizer of claim 6 further comprising:
   a second summer circuit configured to receive the differential input signal and a second summer tap circuit output and to generate a second summer circuit differential output;
   a second latch configured to receive the second summer circuit differential output from the second summer circuit and to generate a second differential latch output comprising an even first state of the differential feedback equalizer; and
   a second feedback circuit having a second NAND gate coupled to an output of the second latch and configured to generate a second differential tap feedback signal;
   wherein the second feedback circuit comprises a second NAND gate buffer that maintains the second differential tap feedback signal at a predetermined voltage during a reset phase of the second latch.

8. The differential feedback equalizer of claim 7 wherein the summer circuit and the first latch are configured to generate odd differential output signals and the tap summer circuit is configured to receive even differential tap feedback signals.

9. The differential feedback equalizer of claim 1 wherein the first latch comprises a strong-arm latch.

10. The differential feedback equalizer of claim 1 further comprising a CTLE configured to generate the differential input signal.

11. A method of implementing a differential feedback equalizer, the method comprising:
    configuring a summer circuit to receive a differential input signal and a summer tap circuit output and to generate a summer circuit differential output;
    configuring a first latch to receive the summer circuit differential output from the summer circuit and to generate a first differential latch output comprising a first state of the differential feedback equalizer; and
    providing a feedback circuit having a NAND gate coupled to an output of the first latch and configured to generate a differential tap feedback signal;
    wherein the feedback circuit comprises a NAND gate buffer that maintains the differential tap feedback signal at a predetermined voltage during a reset phase of the first latch.

12. The method of claim 11 further comprising configuring a second latch to receive the first differential latch output and generate second state of the differential feedback equalizer.

13. The method of claim 12 wherein configuring a second latch comprises an configuring an NRZ latch.

14. The method of claim 11 further comprising configuring a delay element to provide a delayed clock signal to control the NAND gate buffer.

15. The method of claim 11 further comprising configuring a tap summer circuit to provide the summer tap circuit output.

16. The method of claim 15 wherein the method of implementing a differential feedback equalizer comprises a method of implementing a half sample rate differential feedback equalizer, the method further comprising configuring the summer circuit and the first latch to generate odd differential output signals and configuring the tap summer circuit to receive even differential tap feedback signals.

17. The method of claim 16 further comprising:
    configuring a second summer circuit to receive the differential input signal and a second summer tap circuit output and to generate a second summer circuit differential output;
    configuring a second latch to receive the second summer circuit differential output from the second summer circuit and to generate a second differential latch output comprising an even first state of the differential feedback equalizer; and providing a second feedback circuit having a second NAND gate coupled to an output of the second latch and configured to generate a second differential tap feedback signal;

wherein the second feedback circuit comprises a second NAND gate buffer that maintains the second differential tap feedback signal at a predetermined voltage during a reset phase of the second latch.

18. The method of claim 17 further comprising configuring the summer circuit and the first latch to generate odd differential output signals and configuring the tap summer circuit to receive even differential tap feedback signals.

19. The method of claim 11 wherein configuring the latch comprises configuring a strong-arm latch.

20. The method of claim 11 further comprising configuring a CTLE to generate the differential input signal.

* * * * *